(12) United States Patent
Xu et al.

(10) Patent No.: US 11,199,428 B2
(45) Date of Patent: Dec. 14, 2021

(54) DEVICE FOR MEASURING FLOW RATE OF WET GAS BASED ON AN EXEMPT RADIOACTIVE SOURCE

(71) Applicant: WUXI SEA PIONEERS TECHNOLOGIES CO., LTD, Wuxi (CN)

(72) Inventors: Bin Xu, Wuxi (CN); Jige Chen, Wuxi (CN); Peng Guo, Wuxi (CN); Jingyang Li, Wuxi (CN)

(73) Assignee: WUXI SEA PIONEERS TECHNOLOGIES CO., LTD, Wuxi (CN)

( * ) Notice: Subject to any disclaimer, the term of this patent is extended or adjusted under 35 U.S.C. 154(b) by 382 days.

(21) Appl. No.: 16/335,263

(22) PCT Filed: Dec. 11, 2017

(86) PCT No.: PCT/CN2017/115474
§ 371 (c)(1),
(2) Date: Mar. 21, 2019

(87) PCT Pub. No.: WO2019/113741
PCT Pub. Date: Jun. 20, 2019

(65) Prior Publication Data
US 2020/0264020 A1 Aug. 20, 2020

(51) Int. Cl.
*G01F 1/40* (2006.01)
*G01F 1/88* (2006.01)
(Continued)

(52) U.S. Cl.
CPC .............. *G01F 1/40* (2013.01); *G01F 1/7042* (2013.01); *G01F 1/74* (2013.01); *G01F 1/88* (2013.01); *G01N 9/24* (2013.01)

(58) Field of Classification Search
CPC .... G01F 1/40; G01F 1/74; G01F 1/88; G01N 9/24
See application file for complete search history.

(56) References Cited

U.S. PATENT DOCUMENTS

| 6,405,604 B1* | 6/2002 | Berard | G01F 1/74 73/861.63 |
| 7,500,405 B2* | 3/2009 | Gongaware | G01F 1/40 73/861.52 |

(Continued)

FOREIGN PATENT DOCUMENTS

| CN | 102246009 A | 11/2011 |
| CN | 105890689 A | 8/2016 |

(Continued)

OTHER PUBLICATIONS

Scheers, A.M. (2000). An oil/water/gas composition meter based on multiple energy gamma ray absorption (MEGRA) measurement (IAEA-TECDOC-1142). International Atomic Energy Agency (IAEA). (Year: 2000).*

*Primary Examiner* — Paul M. West
(74) *Attorney, Agent, or Firm* — Bayramoglu Law Offices LLC

(57) ABSTRACT

A device for measuring flow rate of wet gas based on an exempt radioactive source, includes a section of cylindrical pipe and a conical throttle located inside the cylindrical pipe and coaxially arranged therewith. The conical throttle includes a head cone section and a tail cone section arranged to have a common bottom surface. The head cone section faces a wet gas inlet of the cylindrical pipe. An annular gap is defined between the inner wall of the cylindrical pipe and the maximum diameter of the conical throttle for passage of wet gas. An exempt radioactive source block is arranged at the maximum diameter of the conical throttle in such a way that the gamma rays emitted from the radioactive source
(Continued)

block can transmit radially through the annular gap to reach the gamma ray detector located outside the cylindrical pipe.

6 Claims, 1 Drawing Sheet

(51) Int. Cl.
    *G01N 9/24*         (2006.01)
    *G01F 1/74*         (2006.01)
    *G01F 1/704*       (2006.01)

(56) References Cited

U.S. PATENT DOCUMENTS

| | | | | |
|---|---|---|---|---|
| 2006/0236779 A1* | 10/2006 | Atkinson | ............ | G01F 1/44 |
| | | | | 73/861.03 |
| 2009/0000390 A1* | 1/2009 | Duhanyan | ............ | G01F 1/44 |
| | | | | 73/861.04 |

FOREIGN PATENT DOCUMENTS

| | | | |
|---|---|---|---|
| CN | 107843308 A | 3/2018 | |
| CN | 207610739 U | 7/2018 | |
| JP | H07260664 A | 10/1995 | |
| SU | 542406 A1 | 12/1988 | |

\* cited by examiner

DEVICE FOR MEASURING FLOW RATE OF WET GAS BASED ON AN EXEMPT RADIOACTIVE SOURCE

CROSS REFERENCE TO THE RELATED APPLICATIONS

This application is the national phase entry of International Application No. PCT/CN2017/115474, filed on Dec. 11, 2017, the entire contents of which are incorporated herein by reference.

TECHNICAL FIELD

The invention is in the field of the flow rate metering device, and in particular, it relates to a device for metering flow rate of wet gas based on an exempt radioactive source.

BACKGROUND

In the oil and gas industry, the oil well product refers to a gas-liquid mixed fluid simultaneously comprising liquid crude oil and natural gas, and the gas-liquid mixed liquid is called as "multiphase fluid" in the art. Said gas phase includes, for example, oil field gas or any gases which are non-condensable at room temperature, particularly, such as methane, ethane, propane, butane and the like, and said liquid phase includes an oil phase, for example, crude oil and other liquid additives which are dissolved in the crude oil during the exploration of crude oil, and a water phase, e.g., formation water, water which is injected into oil wells during the exploration, and other liquid additives which are dissolved in the water phase. In practice, the phase separation between the oil phase and the water phase may occur, and it is also possible that the oil phase and the water phase are mixed together or entirely emulsified. How to real-time and accurately measure the gas flow rate and liquid flow rate in the gas-liquid mixed liquid explored from oil wells and how to further measure the flow rate of the oil, gas and water phases are essential for management and production optimization of oil and gas mineral resources. When the mass percentage of gas phase in a multiphase fluid is higher than 80%, the multiphase fluid is customarily called as "wet gas". Materials that explored from submarine oil and gas fields and shale each are wet gas.

In the prior art, the most advanced method for the simultaneous measurement of the mass flow rates of the gas, oil and water phases in a wet gas is a gamma ray measurement method, and its mechanisms reside in measuring the total mass flow rate of the wet gas by using a Venturi tube, measuring the respective phase fractions of the gas, oil and water phases at the throat of the Venturi tube by using a dual-energy gamma ray monitor, and then calculating the respective mass flow rate of the gas, oil, and water phases by multiplying the respective phase fractions thereof with the total mass flow rate.

Gamma ray must transmits the diameter of the throat of the Venturi tube, and the phase fraction can be obtained by measuring the ratio of the intensity of the gamma ray that transmits the throat to the intensity of the initially radiated gamma ray, and then converting the ratio. Under constraints of a given throttling area ratio, the diameter of the throat will increase with the increase of the diameter of the inlet. When the diameter of the throat is increased to such a size that it results in a very low proportion of the gamma rays that transmits the throat, and accordingly, in the case of the equivalent detection preciseness of the gamma ray receiver, the measurement preciseness will decrease. In order to assure the measurement preciseness, the problem should be solved by enhancing the intensity of the gamma ray source in technique.

According to relevant provisions in the documents "Announcement on the Publication of Classification of Radioactive Sources" (i.e., "State Environmental Protection Administration Announcement No. 62 in 2005") and by referring to relevant provisions in International Atomic Energy Agency, in China, based on extents of potential harms of radioactive sources on human health and environments, radioactive sources, from a high level to a low level, are classified into the following classes I, II, III, IV and V, wherein the lower limit activity value of class V radioactive sources is defined as the exempt activity of corresponding isotope:

Class I radioactive sources are extreme highly dangerous sources, and if no preventive measures, human will die when contacting with this kind of sources for several minutes to one hour;

Class II radioactive sources are highly dangerous sources, and if no preventive measures, human will die when contacting with this kind of sources for several hours to several days;

Class III radioactive sources are dangerous sources, and if no preventive measures, permanent injuries will occur in human body when contacting this kind of sources for several hours, and human also will die when contacting them for several days to several weeks;

Class IV radioactive sources are sources that have low risks, and they cannot produce any permanent injuries on human body; however, this kind of sources will produce restorable temporary injuries on human body that is in a close contact with them for a long period;

Class V radioactive sources are sources that have extreme low risks, and they cannot produce any permanent injuries on human body.

Generally, if the activity of a radioactive source is less than or equal to the lower limit activity of Class V radioactive source, the radioactive source is called as an exempt radioactive source.

At present, gamma ray sources as used in gamma ray wet gas flow meters in industry all are non-exempt radioactive sources in Class III or in other levels that have higher risks. Under considerations to the safety, executive authorities from all around the world strictly manage and control storage, applications and transportation of strong radioactive sources, and this produces huge obstacles for industrial production and commercial use of gamma ray-based wet gas flow rate measurement devices.

Hence, it is always desired that the exempt radioactive sources can replace the traditional strong radioactive sources that are strictly managed and controlled, because executive authorities make most easing managements and controls on the exempt radioactive sources so that the exempt radioactive sources almost can be used freely. However, since the exempt radioactive sources have very low activity, for large wet gas pipes in industry, gamma ray emitted by the exempt radioactive sources usually become very weak after transmitting the throat of Venturi tube. Thus, it is difficult to precisely detect the transmitted gamma ray, and it results in decrease of the measurement preciseness. Due to this defect, the exempt radioactive sources are hardly applied in industry.

The invention is aimed to solve the above problem.

SUMMARY

A first aspect of the invention provides a device for measuring flow rate of wet gas based on an exempt radioactive source, comprising a section of cylindrical pipe 1 and a conical throttle 2 located inside the cylindrical pipe and coaxially arranged therewith. The conical throttle 2 comprises a head cone section 22 and a tail cone section 23 which are arranged to have a common bottom surface, wherein the head cone section 22 faces a wet gas inlet of the cylindrical pipe 1. An annular gap 3 is defined between the inner wall of the cylindrical pipe 1 and the maximum diameter of the conical throttle 2 for passage of wet gas. An exempt radioactive source block 4 is arranged at the maximum diameter 21 of the conical throttle 2 in such a way that the gamma rays emitted from the radioactive source block can transmit radially through the annular gap 3 to reach the gamma ray detector 5 located outside the cylindrical pipe 1.

Preferably, the device for measuring flow rate of wet gas based on an exempt radioactive source further comprises a differential pressure measuring device 6 comprising two pressure measuring ports, wherein the first pressure measuring port 61 is located at the side wall of the cylindrical pipe 1 at the upstream of the head cone section 22, and the second pressure measuring port 62 is located at the tip of the tail cone section 23.

Preferably, the second pressure measuring port 62 reaches the exterior of the cylindrical pipe 1 and connects the differential pressure measuring device 6 via a pressure guiding pipe that runs through the central axis of the conical throttle 2.

Preferably, the exempt radioactive sources are Class V radioactive sources as above described, preferably $Ba^{133}$. Certainly, the other exempt radioactive sources also are useful.

Preferably, the cone angle of the head cone section 22 is from 30 to 45°, and an acute angle or a right angle is formed between the cone surface of the head cone section 22 and the cone surface of the tail cone section 23.

Preferably, the annular gap 3 has a width of less than 50 mm, such as from 25 to 50 mm.

Preferably, there are a plurality of the exempt radioactive source blocks 4, and they are preferably arranged to have a homogenous circumferential distribution.

A second aspect of the invention further discloses a device for measuring flow rate of wet gas based on an exempt radioactive source, comprising a section of cylindrical pipe 1 and a conical throttle 2 located inside the cylindrical pipe and coaxially arranged therewith. The conical throttle 2 comprises a head cone section 22 and a tail cone section 23 which are arranged to have a common bottom surface, wherein the head cone section 22 faces a wet gas inlet of the cylindrical pipe 1. A gradually decreased annular gap space 9 is defined between the inner wall of the cylindrical pipe 1 and the cone surface of the head cone section 22 for passage of wet gas. An exempt radioactive source block 4 is arranged at the cone surface of the head cone section 22 in such a way that the gamma rays emitted from the radioactive source block can transmit radially through the gradually decreased annular gap space 9 to reach the gamma ray detector 5 located outside the cylindrical pipe 1, wherein the gradually decreased annular gap space 9 through which the gamma ray transmits has a radial width of less than 50 mm.

In order to suit to the device for measuring flow rate of wet gas based on an exempt radioactive source according to the invention, the applicant further develops a unique calculation method, and the calculation method is to apply another patent separately.

The present invention achieves the following beneficial effects:

1. The invention abandons the structure of conventional central throttling flow meters for wet gas with the combination of a Venturi tube and a gamma ray detector, to use a peripheral throttling flow meter with the combination of a conical throttle and a gamma ray detector. Under the circumstance that the flowing section area of the annular gap is equivalent to that of the throat of the Venturi tube, the distance in which the gamma ray should transmit through the wet gas that flow through the annular gap is much shorter as compared to the throat of the Venturi tube. Thus, an exempt radioactive source having a lower activity can be used to replace strong radioactive sources in conventional flow meters. Since the executive authorities from all around the world do not manage and control productions, transportations and applications of exempt radioactive sources, this provides great conveniences to manufacture, transportations, representation and applications of finished wet gas flow meters. In addition, the preciseness and accuracy of the flow measuring device according to the invention are not lower than those of conventional wet gas flow meters.

2. The peripheral throttling means in the invention is advantageous to adjust distribution of the flowing velocity field, and to reduce liquid-gas slip.

3. Vortex in tail fluids is small, and noise extent is low, which are advantageous to expand the turn down ratio.

BRIEF DESCRIPTIONS OF THE DRAWINGS

The reference numbers in these Figures have the following meanings:

1—cylindrical pipe; 2—conical throttle; 21—location at the maximum diameter of the conical throttle; 22—head cone section; 23—tail cone section; 3—annular gap; 4—exempt radioactive source block; 5—gamma ray detector; 6—differential pressure measuring device; 61—first pressure measuring port; 62—second pressure measuring port; 7—pressure meter; 8—thermometer; 9—gradually decreased annular gap space.

DETAILED DESCRIPTION OF THE EMBODIMENTS

The following examples are provided with the purpose for illustrating the contents in the invention, but not for further restricting the protection scope of the invention.

Example 1

Figure 1:
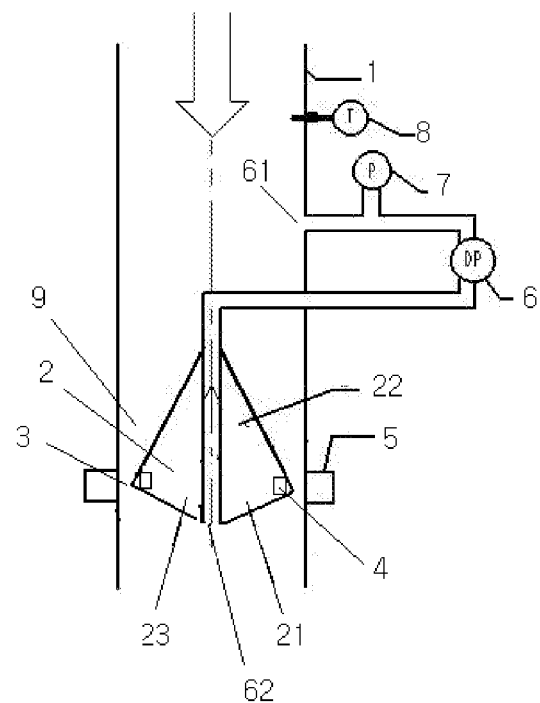
FIG. 1 is a schematic drawing of the structure of the device for measuring flow rate of wet gas based on an exempt radioactive source in the invention.

As shown in FIG. 1, the device for measuring flow rate of wet gas based on an exempt radioactive source according to the invention comprises a section of cylindrical pipe 1 and a conical throttle 2 located inside the cylindrical pipe and coaxially arranged therewith. The conical throttle 2 comprises a head cone section 22 and a tail cone section 23 which are arranged to have a common bottom surface and have the same bottom surface area, wherein the head cone section 22 faces a wet gas inlet of the cylindrical pipe 1. An annular gap 3 is defined between the inner wall of the cylindrical pipe 1 and the maximum diameter of the conical throttle 2 for passage of wet gas. A material block 4 of the exempt radioactive source Ba$^{133}$ having an activity of lower than 25 μCi is arranged at the maximum diameter 21 of the conical throttle 2 in such a way that the gamma rays emitted from the radioactive source block can transmit radially through the annular gap 3 to reach the gamma ray detector 5 located outside the cylindrical pipe 1. A differential pressure measuring device 6 is arranged at the exterior of the cylindrical pipe 1, and it has two pressure measuring ports, wherein the first pressure measuring port 61 is located at the side wall of the cylindrical pipe 1 at the upstream of the head cone section 22, and the second pressure measuring port 62 is located at the tip of the tail cone section 23, and wherein the second pressure measuring port 62 reaches the exterior of the cylindrical pipe 1 and connects the differential pressure measuring device 6 via a pressure guiding pipe that runs through the central axis of the conical throttle 2. At the upstream of the first pressure measuring port, a thermometer 8 is arranged, and meanwhile, the first pressure measuring port is further connected to a pressure meter 7. The bending part of the above pressure guiding pipe should be apart from the first pressure measuring port in at least 2D distance, wherein the D represents the inner diameter of the cylindrical pipe. In this example, the cone angle of the head cone section 22 is 30°, and the angle between the cone surface of the head cone section 22 and the cone surface of the tail cone section 23 is 90°.

The measurement is conducted as follows: the wet gas flows through the inlet end of the cylindrical pipe 1, and its temperature T and pressure P are measuring during the flowing; thereafter, the wet gas flows through the annular gap under the guidance of the conical throttle, thereby to exert the throttling function; hence, the pressure differential ΔP caused by the throttling function is measured by the above pressure differential measuring device. At the annular gap, the mass phase fraction $\alpha_{gas}$ of the gas phase, the mass phase fraction $\alpha_{oil}$ of the oil phase, and the mass phase fraction $\alpha_{water}$ of the water phase are measured by the gamma ray detector, wherein $\alpha_{gas}+\alpha_{oil}+\alpha_{water}=1$, and then, the following steps are used to calculate the respective mass flow rate of the gas, oil and water phase:

1. the mixed density of the multiphase fluid is calculated according to the following equation:

$$\rho=\rho_{water}\times\alpha_{water}+\rho_{oil}\times\alpha_{oil}+\rho_{gas}\times\alpha_{gas};$$

2. the total mass flow rate $Q_m$ of the multiphase fluid is calculated according to the following equation:

$$Q_m = k \cdot \sqrt{\Delta P \cdot \rho}$$

wherein:
$Q_m$ - - - mass flow rate, kg/h;
k - - - coefficient;
ΔP - - - differential pressure, kPa;
ρ - - - mixed density of the multiphase fluid, kg/m$^3$;
wherein:

$$k = 0.126447 \cdot \frac{C \cdot \varepsilon}{\sqrt{1-\beta^4}} \cdot (D^2 - d^2)$$

$$\beta = \frac{\sqrt{D^2 - d^2}}{D}$$

wherein:
β - - - equivalent diameter ratio, usually from 0.35 to 0.75;
D - - - inner diameter of the cylindrical pipe 1, m;
d - - - maximum diameter of the conical throttle, m;
ε - - - compression coefficient, for liquids, ε=1, and as for gases, $$\varepsilon = \sqrt{\frac{k\tau^{2/k}}{k-1}\frac{1-\beta^4}{1-\beta^4\tau^{2/k}}\frac{1-\tau^{\frac{k-1}{k}}}{1-\tau}},$$

wherein k is the isentropic coefficient, generally, for mono-atomic gases, k=1.67, for di-atomic gases, k=1.40, and for multi-atomic gases, k=1.10-1.29; the k values of some common gases are listed as follows: argon gas k=1.67, helium gas k=1.67, hydrogen gas k=1.40, nitrogen gas k=1.40, oxygen gas 02 k=1.39, carbon monoxide k=1.40, air k=1.40, steam k=1.33, carbon dioxide k=1.29, sulfur dioxide k=1.25, methane k=1.30, and propane k=1.13;

wherein τ is the pressure ratio $P_2/P_1$, wherein $P_2$ is the downstream pressure of the conical throttle, and $P_1$ is the upstream pressure of the conical throttle;

wherein the flowing coefficient C can be obtained in situ by flow rate calibration method, typically, in the numerical range from 0.75 to 0.85, or it can be calculated according to the following empirical equation:

$$C = 1 - \left(1 - \frac{0.0254}{D+0.0254}\right)\beta + \left(2.5 - \frac{0.1638}{D+0.1635}\right)\beta^2 - \left(2.15 - \frac{0.2313}{D+0.1194}\right)\beta^3;$$

3. respective mass flow rate of the oil, gas, and water phases are calculated according to the following equations:

$$Q_{gas}=Q_m\times\alpha_{gas}$$

$$Q_{water}=Q_m\times\alpha_{water}$$

$$Q_{oil}=Q_m\times\alpha_{oil}.$$

The respective physical quantities in the above equation each are expressed by International System of Unit, and they should suit to each other.

Example 2

Figure 2:
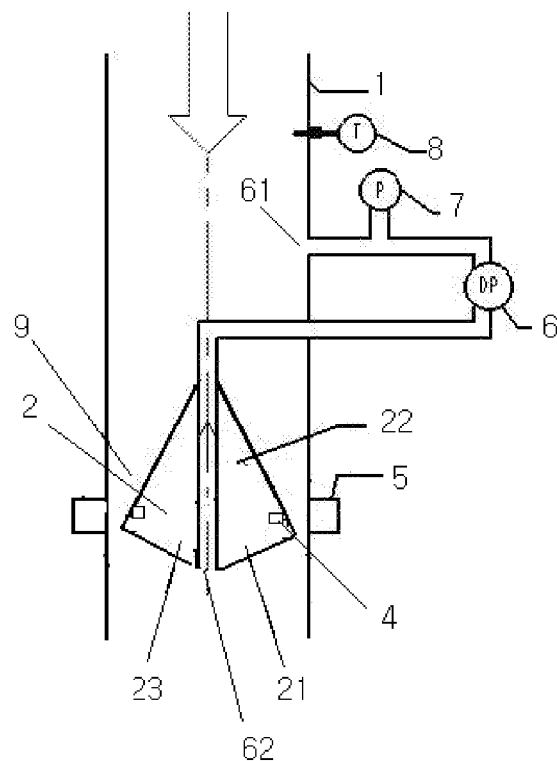
FIG. 2 is a more broadly schematic drawing of the device for measuring flow rate of wet gas based on an exempt radioactive source in the invention.

As shown in FIG. 2, the structure differs from the structure as shown in FIG. 1 in that the exempt radioactive source is located on the cone surface the head cone section 22 of the conical throttle 2, adjacent to the maximum diameter 21 of the conical throttle 2, and it is arranged in such a way that the gamma rays emitted from the radioactive source block can transmit radially through the gradually decreased annular gap space 9 to reach the gamma ray detector 5 located outside the cylindrical pipe 1, wherein the gradually decreased annular gap space 9 through which the gamma ray transmits has a radial width of less than 50 mm.

The specific method for calculating the mass flow rates is completely identical to that in Example 1.

What is claimed is:

1. A method for measuring flow of a wet gas using a device for measuring a flow rate of the wet gas based on a Ba$^{133}$ radioactive source, wherein the Ba$^{133}$ radioactive source has an activity less than 1×10$^6$ Bq, the device comprising:

a section of a cylindrical pipe and a conical throttle located and coaxially arranged inside the cylindrical pipe;

the conical throttle comprising a head cone section and a tail cone section arranged to have a common bottom surface, wherein the head cone section faces a wet gas inlet of the cylindrical pipe; an annular gap is provided between the inner wall of the cylindrical pipe and a maximum diameter of the conical throttle for passage of the wet gas;

wherein, the $Ba^{133}$ radioactive source includes a $Ba^{133}$ radioactive source block, the $Ba^{133}$ radioactive source block is arranged at the maximum diameter of the conical throttle, wherein, gamma rays emitted from the $Ba^{133}$ radioactive source block transmit radially through the annular gap to reach a gamma ray detector located outside the cylindrical pipe;

a differential pressure measuring device comprising a first pressure measuring port located at a side wall of the cylindrical pipe at an upstream of the head cone section, and a second pressure measuring port located at a tip of the tail cone section;

the method comprising:

flowing the wet gas through the inlet end of the cylindrical pipe, and measuring a temperature T and a pressure P of the wet gas during the flowing;

thereafter, flowing the wet gas through the annular gap under a guidance of the conical throttle, to exert a throttling function;

measuring a pressure differential ΔP caused by the throttling function by the pressure differential measuring device;

measuring a mass phase fraction $\alpha_{gas}$ of a gas phase, a mass phase fraction $\alpha_{oil}$ of an oil phase, and a mass phase fraction $\alpha_{water}$ of a water phase by the gamma ray detector; and then, using the following steps to calculate a mass flow rate of the gas, oil and water phases:

1) a mixed density of the wet gas is calculated according to the following equation:

$$\rho = \rho_{water} \times \alpha_{water} + \rho_{oil} \times \alpha_{oil} + \rho_{gas} \times \alpha_{gas};$$

2) a total mass flow rate $Q_m$ of the wet gas is calculated according to the following equation:

$$Q_m = K_0 \cdot \sqrt{\Delta P \cdot \rho}$$

wherein:

$Q_m$ - - - mass flow rate, kg/h;
$K_0$ - - - coefficient;
ΔP - - - differential pressure, kPa;
ρ - - - mixed density of the wet gas, kg/m³;

wherein:

$$K_0 = 0.126447 \cdot \frac{C \cdot \varepsilon}{\sqrt{1-\beta^4}} \cdot (D^2 - d^2)$$

$$\beta = \frac{\sqrt{D^2 - d^2}}{D}$$

wherein:

β - - - equivalent diameter ratio, usually from 0.35 to 0.75;
D - - - inner diameter of the cylindrical pipe 1, m;
d - - - maximum diameter of the cone throttle, m;
ε - - - compression coefficient, for liquids, ε=1, and as for gases, $$\varepsilon = \sqrt{\frac{k\tau^{2/k}}{k-1} \frac{1-\beta^4}{1-\beta^4\tau^{2/k}} \frac{1-\tau^{\frac{k-1}{k}}}{1-\tau}}$$

wherein k is an isentropic coefficient, generally, for monoatomic gases, k=1.67, for di-atomic gases, k=1.40, and for multi-atomic gases, k=1.10-1.29;

wherein τ is the pressure ratio $P_2/P_1$, wherein $P_2$ is the downstream pressure of the conical throttle, and $P_1$ is the upstream pressure of the conical throttle;

wherein the flowing coefficient C can be obtained in situ by flow rate calibration method, typically, in the numerical range from 0.75 to 0.85, or it can be calculated according to the following empirical equation:

$$C = 1 - \left(1 - \frac{0.0254}{D+0.0254}\right)\beta + \left(2.5 - \frac{0.1638}{D+0.1635}\right)\beta^2 - \left(2.15 - \frac{0.2313}{D+0.1194}\right)\beta^3$$

3) the mass flow rate of the oil, gas, and water phases are calculated according to the following equations:

$$Q_{gas} = Q_m \times \alpha_{gas}$$

$$Q_{water} = Q_m \times \alpha_{water}$$

$$Q_{oil} = Q_m \times \alpha_{oil};$$

wherein the respective physical quantities in the above equation each are expressed by International System of Unit, and they should suit to each other.

2. The method of claim 1, wherein, the second pressure measuring port reaches fan exterior of the cylindrical pipe and connects the differential pressure measuring device via a pressure guiding pipe running through a central axis of the conical throttle.

3. The method of claim 1, wherein, a cone angle of the head cone section is from 30 to 45°, and an acute angle is formed between a cone surface of the head cone section and a cone surface of the tail cone section.

4. The method of claim 1, wherein, the $Ba^{133}$ radioactive source includes a plurality of the $Ba^{133}$ radioactive source blocks.

5. The method of claim 1, wherein, the device comprises a thermometer and a pressure meter.

6. The method of claim 1, wherein, the annular space is a gradually decreasing annular gap space provided between an inner wall of the cylindrical pipe and a cone surface of the head cone section for passage of the wet gas.

* * * * *